United States Patent
Al-Ansari et al.

(10) Patent No.: US 12,490,687 B2
(45) Date of Patent: Dec. 9, 2025

(54) GREENHOUSE SYSTEM

(71) Applicant: Qatar Foundation for Education, Science and Community Development, Doha (QA)

(72) Inventors: Tareq A Al-Ansari, Doha (QA); Muhammad Luqman, Doha (QA); Farhat Mahmood, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 0 days.

(21) Appl. No.: 18/859,071

(22) PCT Filed: Apr. 25, 2023

(86) PCT No.: PCT/QA2023/050002
§ 371 (c)(1),
(2) Date: Oct. 22, 2024

(87) PCT Pub. No.: WO2023/211300
PCT Pub. Date: Nov. 2, 2023

(65) Prior Publication Data
US 2025/0280769 A1  Sep. 11, 2025

Related U.S. Application Data (60) Provisional application No. 63/334,782, filed on Apr. 26, 2022.

(51) Int. Cl.
*A01G 9/14* (2006.01)
*A01G 9/24* (2006.01)

(52) U.S. Cl.
CPC ............... *A01G 9/14* (2013.01); *A01G 9/243* (2013.01); *A01G 9/247* (2013.01)

(58) Field of Classification Search
CPC . A01G 9/14; A01G 9/24; A01G 9/247; A01G 9/245; A01G 9/243
See application file for complete search history.

(56) References Cited

U.S. PATENT DOCUMENTS 5,813,168 A * 9/1998 Clendening .............. A01G 9/00
                                                                47/17
5,967,085 A * 10/1999 Kawamura ............ A01K 63/04
                                                                119/215

(Continued)

FOREIGN PATENT DOCUMENTS

CN      202026644 U  * 11/2011  ........... Y02A 20/142
DE  102012103475 A1 * 10/2013  ........... B01D 5/0006

(Continued)

OTHER PUBLICATIONS

International Search Report for related International Application No. PCT/QA2023/050002; action dated Nov. 2, 2023; (3 pages).

(Continued)

*Primary Examiner* — Peter M Poon
*Assistant Examiner* — Carly W. Lynch
(74) *Attorney, Agent, or Firm* — K&L Gates LLP (57) ABSTRACT

A greenhouse system includes an enclosed platform for growing a plant, wherein the enclosed platform is configured to float at water level; a first heat exchanger at a first depth below water level; and a second heat exchanger at a second depth below water level.

11 Claims, 7 Drawing Sheets

(56) References Cited

U.S. PATENT DOCUMENTS

| | | | |
|---|---|---|---|
| 8,146,362 B2* | 4/2012 | Howard | F03G 7/04 |
| | | | 60/641.7 |
| 9,510,520 B2 | 12/2016 | Gamberini | |
| 10,584,042 B2* | 3/2020 | Emmerich | B01D 3/34 |
| 2011/0079375 A1 | 4/2011 | Nagurny et al. | |
| 2013/0042612 A1* | 2/2013 | Shapiro | F03G 7/05 |
| | | | 60/641.7 |
| 2015/0223409 A1 | 8/2015 | Abahusayn | |
| 2017/0035002 A1* | 2/2017 | Ellins | A01G 31/02 |
| 2020/0146222 A1 | 5/2020 | Roach, Jr. et al. | |

FOREIGN PATENT DOCUMENTS

| | | | | |
|---|---|---|---|---|
| EP | 0517432 A1 * | 12/1999 | | A01G 9/246 |
| KR | 20220023723 A * | 3/2022 | | A01G 31/02 |
| NL | 1016863 C2 * | 6/2022 | | A01G 9/14 |

OTHER PUBLICATIONS

Written Opinion for related International Application No. PCT/QA2023/050002; action dated Nov. 2, 2023; (3 pages).

* cited by examiner

GREENHOUSE SYSTEM

CROSS-REFERENCES TO RELATED APPLICATIONS

The present disclosure is a National Stage filing under 35 U.S.C. 371 of International Application No. PCT/QA2023/050002, filed Apr. 25, 2023, which claims priority to U.S. Provisional Patent Application 63/334,782 having a filing date of Apr. 26, 2022, the entirety of which is incorporated herein.

BACKGROUND

Based on increased food demands and climate change, reliable food supply is an issue in many areas. Furthermore, conventional food production and transportation contribute to global $CO^2$ emissions, magnifying issues related to climate change. To minimize the effects of conventional food production on climate change, it is important to consider regional population densities across the globe, which are expected to significantly increase in coastal areas. Agricultural systems that are capable of providing favorable conditions, independent of the ambient environmental conditions, are one possible solution to minimize food transportation. However, current agricultural systems can be energy and resource intensive. Therefore, improved agricultural systems are needed.

SUMMARY

In light of the disclosure herein and without limiting the disclosure in any way, in a first aspect of the present disclosure, which may be combined with any other aspect listed herein unless specified otherwise, a greenhouse system is provided. The greenhouse system includes an enclosed platform for growing a plant, wherein the enclosed platform is configured to float at water level; a first heat exchanger at a first depth below water level; and a second heat exchanger at a second depth below water level.

In accordance with a second aspect of the present disclosure, which may be used in combination with any other aspect listed herein unless stated otherwise, the second depth of the second heat exchanger is greater than the first depth of the first heat exchanger.

In accordance with a third aspect of the present disclosure, which may be used in combination with any other aspect listed herein unless stated otherwise, the first heat exchanger is configured to maintain a psychrometric condition within the greenhouse system.

In accordance with a fourth aspect of the present disclosure, which may be used in combination with any other aspect listed herein unless stated otherwise, the psychrometric condition within the greenhouse system is based on the first depth of the first heat exchanger.

In accordance with a fifth aspect of the present disclosure, which may be used in combination with any other aspect listed herein unless stated otherwise, the second heat exchanger is configured to provide water to the greenhouse system.

In accordance with a sixth aspect of the present disclosure, which may be used in combination with any other aspect listed herein unless stated otherwise, the second heat exchanger provides water to the greenhouse system based on the second depth of the second heat exchanger.

In accordance with a seventh aspect of the present disclosure, which may be used in combination with any other aspect listed herein unless stated otherwise, the greenhouse system further includes a plurality of fans.

In accordance with an eighth aspect of the present disclosure, which may be used in combination with any other aspect listed herein unless stated otherwise, a first fan of the plurality of fans is configured to pass air through the first heat exchanger.

In accordance with a ninth aspect of the present disclosure, which may be used in combination with any other aspect listed herein unless stated otherwise, the first fan is configured to pass air from within the greenhouse system through the first heat exchanger.

In accordance with a tenth aspect of the present disclosure, which may be used in combination with any other aspect listed herein unless stated otherwise, a second fan of the plurality of fans is configured to pass air through the second heat exchanger.

In accordance with an eleventh aspect of the present disclosure, which may be used in combination with any other aspect listed herein unless stated otherwise, the second fan is configured to pass air from outside of the greenhouse system through the second heat exchanger.

In accordance with a twelfth aspect of the present disclosure, which may be used in combination with any other aspect listed herein unless stated otherwise, the greenhouse system further includes a solar panel configured to provide electricity to the greenhouse system.

In accordance with a thirteenth aspect of the present disclosure, which may be used in combination with any other aspect listed herein unless stated otherwise, the greenhouse system further includes a plurality of pumps configured to transport water from the first heat exchanger to the enclosed platform.

In accordance with a fourteenth aspect of the present disclosure, which may be used in combination with any other aspect listed herein unless stated otherwise, the plurality of pumps are configured to transport water from the second heat exchanger to the enclosed platform.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure generally relates to a greenhouse system. The greenhouse system includes an enclosed platform for growing plants. Further, the greenhouse system floats on water and includes a primary heat exchanger and a secondary heat exchanger to promote plant growth. Namely, air from the greenhouse system passes through the primary heat exchanger, which is immersed at a first depth below water level, and reenters the greenhouse system to maintain a desired psychrometric condition. In addition, air from outside the greenhouse system passes through a secondary heat exchanger, which is immersed at a second depth below water, and undergoes a process of dehumidification. The water produced by the secondary heat exchanger is then used to irrigate the crops.

In order to force air through the primary heat exchanger and the secondary heat exchanger, the greenhouse system may use electricity from a solar panel to power a plurality of fans. The electricity produced by the solar panel may also be used to control a plurality of pumps for transporting water to the enclosed platform from the primary or secondary heat exchangers. In many examples, the distance below the surface of the primary and secondary heat exchangers can be varied according to the plants in the greenhouse system.

Figure 1:
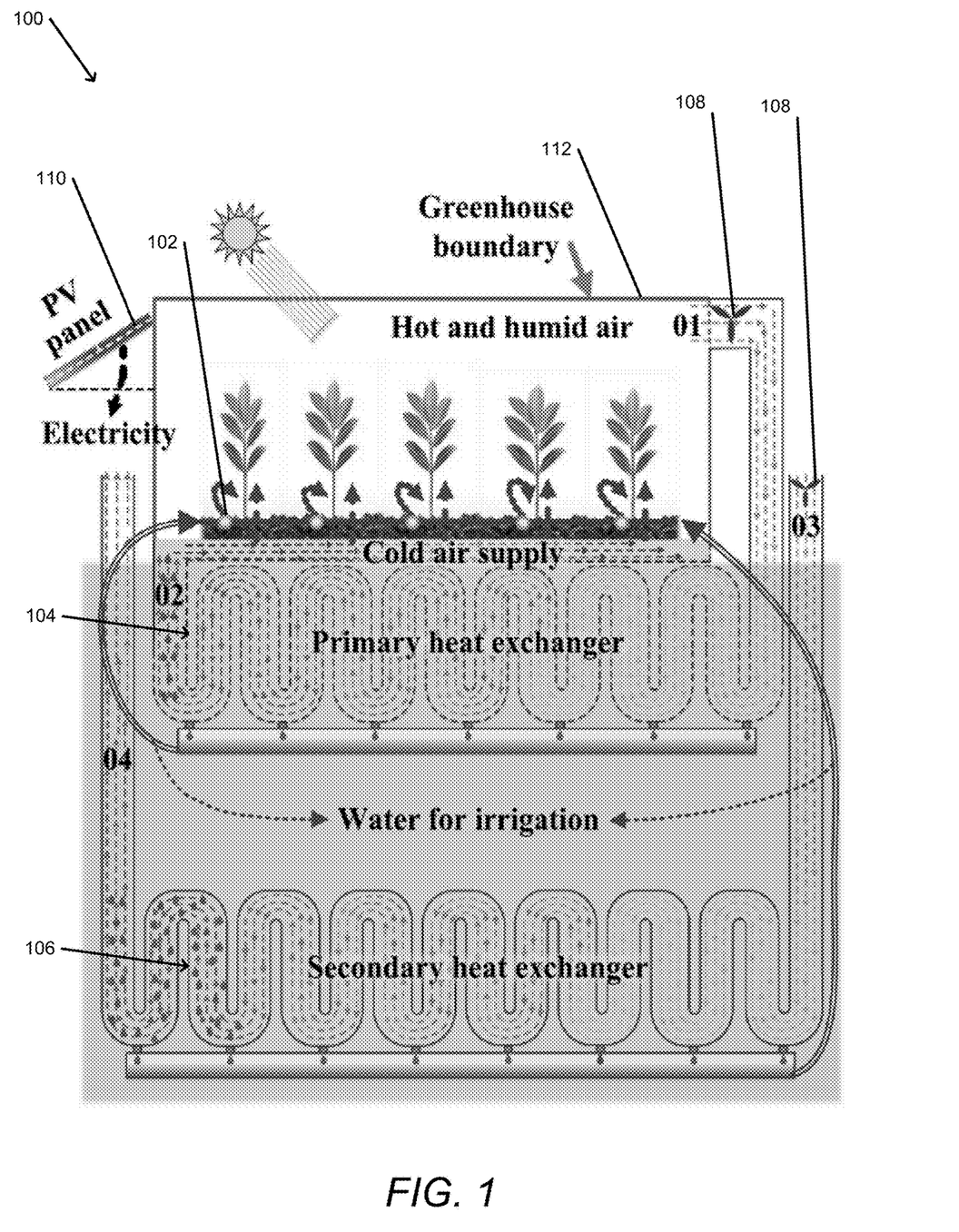
FIG. 1 illustrates a greenhouse system, according to various examples of the present disclosure.

FIG. 1 illustrates a greenhouse system, according to various examples of the present disclosure. The greenhouse system 100 includes an enclosed platform 102 for growing a plant and a solar panel 110 for producing electricity. The enclosed platform 102 is configured to float at water level and includes a greenhouse boundary 112. The greenhouse system 100 further includes a primary, or first, heat exchanger 104; a secondary, or second, heat exchanger 106; and a plurality of fans 108. The primary heat exchanger 104 is immersed at a first depth below water level and the secondary heat exchanger 106 is immersed at a second depth below water level, which is greater than the first depth of the primary heat exchanger 104. As previously introduced, the temperature of the water generally decreases as the distance from the surface increases. The greenhouse system 100 may advantageously use this correlation for growing a plant.

In an illustrative example, a plant grows on the enclosed platform 102. Further, the primary heat exchanger 104 adjusts the psychrometric conditions of the air inside of the enclosed platform 102 according to the requirements of the greenhouse system 100. Namely, one of the plurality of fans 108 passes air through the primary heat exchanger 104. The primary heat exchanger 104 cools the air before the air is reintroduced into the enclosed platform 102. As air passes through the primary heat exchanger 104, dehumidification may occur, producing water, which can be used to irrigate the plant.

In some embodiments, additional water may be needed to irrigate the plant. Thus, one of the plurality of fans 108 can pass air through the secondary heat exchanger 106. Again, as air passes through the secondary heat exchanger 106, dehumidification occurs, producing water, which can be used to irrigate the plant. However, because the secondary heat exchanger 106 is at a second depth below water level, greater than the first depth of the primary heat exchanger 104, the temperature of the water is cooler. And thus, more water is produced through the dehumidification process. The plurality of fans 108, the control systems, and the pumps for irrigation use the electricity produced by the solar panel 110.

In many embodiments, the first depth of the primary heat exchanger 104 and the second depth of the secondary heat exchanger 106 can be varied for a desired results, which may depend on upon the type of plant and its irrigation requirements, the seasons, the geographical locations, the local environmental conditions. Table I lists different types of plants with their corresponding optimum temperature and humidity range. Based on this information, the depths of each heat exchanger can be altered such that the environment falls within these levels.

TABLE I

Optimum temperature and relative humidity range for different crops.

| Crop | Temperature (° C.) | Relative humidity (%) |
|---|---|---|
| Tomatoes | 20-30 | 60-90 |
| Cucumber | 20-25 | 70-80 |
| Bell pepper | 17-21 | 50-70 |
| Lettuce | 20-30 | 50-70 |

As discussed, air enters the enclosed platform from the primary heat exchanger 104 at a state to maintain the desired psychrometric conditions within the greenhouse system 100. The process is then repeated when air exits a vent to pass through the primary heat exchanger 104. Based on this process, a range of analysis can be completed on many variables.

For example, the mass balance inside the enclosed platform is represented by Equation 1. In Equation 1, $\dot{m}_1$ is the mass of air exiting the enclosed platform, $\dot{m}_2$ is the mass of air entering the enclosed platform, and $\dot{m}_{Evapotranspiration}$ is the mass of water added to the air due to the plant evapotranspiration, which is calculated using Equation 2.

$$\dot{m}_2 + \dot{m}_{Evapotranspiration} = \dot{m}_1 \quad \text{Equation 1}$$

$$\dot{m}_{Evapotranspiration} = ET \cdot A_{Plantation} \quad \text{Equation 2}$$

In Equation 2, ET is the mass of moisture added per unit area due to evapotranspiration. As used in Equation 2, ET is calculated from Equation 3 where $E_\lambda$ is the evapotranspiration flux and $\lambda$ is water's latent heat of vaporization. According to Stanghellini's evapotranspiration model, $E_\lambda$ from the plants is given as Equation 4.

$$ET = \frac{E_\lambda}{\lambda} \quad \text{Equation 3}$$

$$E_\lambda = \frac{\delta \cdot R_n + \left(\frac{2 \cdot LAI \cdot \rho_A + C_p}{r_e}\right) \cdot (VPD)}{\gamma\left(1 + \left(\frac{\delta}{\gamma}\right) + \left(\frac{r_i}{r_e}\right)\right)} \quad \text{Equation 4}$$

In Equation 4, $R_n$ is the net wave short radiation, $\delta$ is the saturation curve's slope, LAI is the plants' leaf area index, $\rho_A$ is the air density, $C_p$ is the specific heat, VPD is the vapor pressure difference, $r_e$ is the external plant resistance, $r_i$ is the internal plant resistance, and $\gamma$ is the psychrometric constant. The energy balance equation applied to the greenhouse system is represented by Equation 5, where h is the enthalpy and $\dot{Q}_{GH}$ is the net thermal heat transfer to the greenhouse system. Equation 6 represents the net thermal heat transfer ($\dot{Q}_{GH}$).

$$\dot{m}_2 \cdot h_2 + \dot{m}_{Evapotranspiration} \cdot h_{Evapotranspiration} + \dot{Q}_{GH} = \dot{m}_1 \cdot h_1 \quad \text{Equation 5}$$

$$\dot{Q}_{GH} = \dot{Q}_{Solar} + \dot{Q}_{Cover} + \dot{Q}_{Long} \quad \text{Equation 6}$$

In Equation 6, $\dot{Q}_{solar}$ is the amount of heat entering the greenhouse system due to solar radiation, $\dot{Q}_{Cover}$ is the amount of heat transfer through the greenhouse boundary 112 of the greenhouse system 100, and $\dot{Q}_{Long}$ is the heat transfer due to thermal radiation. $\dot{Q}_{solar}$ is given in Equation 7, where $I_s$ is the incident solar radiation, $\tau_{cover}$ is the transmissivity of the greenhouse boundary 112, and $A_{GH}$ is the area of the enclosed platform 102. $\dot{Q}_{cover}$ is given by Equation 8.

$$\dot{Q}_{Solar} = \tau_{cover} \cdot I_s \cdot A_{GH} \quad \text{Equation 7}$$

$$\dot{Q}_{Cover} = A_{SGH} \cdot U_{cover} \cdot (T_A - T_{GH}) \quad \text{Equation 8}$$

In Equation 8, $A_{SGH}$ is the surface area of the greenhouse system, and $U_{cover}$ is the heat transfer coefficient of the material of the greenhouse boundary 112 and $T_A$ is the temperature of the ambient air. $\dot{Q}_{Long}$ is given by Equation 9.

$$\dot{Q}_{Long} = \varepsilon_{12} \cdot A_{GHS} \cdot \sigma \cdot \left((T_{GH} + 273.15)^4 - (T_{sky} + 273.15)^4\right) \quad \text{Equation 9}$$

In Equation 9, $\varepsilon_{12}$ is the mutual emission coefficient, $\sigma$ is the Stefan Boltzmann constant, and $T_{sky}$ is the temperature of the sky. $\varepsilon_{12}$ and $T_{sky}$ are represented by the Equation 10 and Equation 11, respectively.

$$\varepsilon_{12} = \left(\varepsilon_1^{-1} + \varepsilon_1^{-1} - 1\right)^{-1} \quad \text{Equation 10}$$

$$T_{sky} = 94 + 12.\ln(e_o) - 13.K_s + 0.341.(T_{Amb} + 273.15) - 273.15 \quad \text{Equation 11}$$

In another example, solar radiation values were taken for an area in the Arabian Sea near the coasts of Oman and Pakistan on two different days in a year to represent summer and winter (i.e. July 10 and January 10). The solar irradiation and ambient temperature data is shown in Table II. The ambient temperature shows a smaller variation for winter and summer throughout the day. Further, the minimum and maximum solar irradiance, the ambient temperature, and the relative humidity for each month are given in Table III. As shown, the solar irradiance and ambient temperature exceeded 1000 Wm$^{-2}$ and 37° C. during July.

TABLE II

Solar irradiation data used in example analysis.

| Time (24 h) | Solar irradiation (Wm$^{-2}$) | | Ambient temperature (° C.) | |
|---|---|---|---|---|
| | 10-Jan | 10-Jul | 10-Jan | 10-Jul |
| 0000 | 0 | 0 | 13 | 27 |
| 0100 | 0 | 0 | 13.6 | 28.1 |
| 0200 | 0 | 0 | 13.2 | 28.4 |
| 0300 | 0 | 0 | 16 | 30 |
| 0400 | 0 | 0 | 15.1 | 29.1 |
| 0500 | 0 | 0 | 17.4 | 29.4 |
| 0600 | 0 | 60.57 | 20.5 | 31.5 |
| 0700 | 18.7 | 271.6 | 20.7 | 29.8 |
| 0800 | 220.3 | 493.7 | 21.3 | 29.7 |
| 0900 | 428.7 | 689.8 | 23.5 | 32.5 |
| 1000 | 593.7 | 842 | 21.8 | 29.6 |
| 1100 | 699.6 | 938.6 | 21.8 | 29.5 |
| 1200 | 738.4 | 972.2 | 24.5 | 32 |
| 1300 | 707 | 940.6 | 21.2 | 29.2 |
| 1400 | 607.3 | 845.9 | 20.8 | 28.9 |
| 1500 | 445.5 | 695.2 | 22 | 30 |
| 1600 | 243.5 | 500.1 | 20.6 | 28.9 |
| 1700 | 33.79 | 278.4 | 20.3 | 28.8 |
| 1800 | 0 | 65.69 | 19 | 29 |
| 1900 | 0 | 0 | 19 | 28.5 |
| 2000 | 0 | 0 | 19.9 | 28.3 |
| 2100 | 0 | 0 | 16.5 | 28 |
| 2200 | 0 | 0 | 19.1 | 28.1 |
| 2300 | 0 | 0 | 18.7 | 27.9 |

TABLE III

Meteorological conditions for each month in example analysis.

| Month | Solar irradiance (Wm$^{-2}$) | Ambient temperature (° C.) | Relative humidity (%) |
|---|---|---|---|
| January | 0-798 | 6-27.5 | 5-99 |
| February | 0-898 | 13.4-30.0 | 10-100 |
| March | 0-968 | 18-37.0 | 8-100 |
| April | 0-994 | 21.9-37.5 | 9-99 |
| May | 0-995 | 25.5-39.0 | 17-97 |
| June | 0-1002 | 26.0-36.5 | 43-97 |
| July | 0-1010 | 25.5-37.5 | 32-93 |
| August | 0-968 | 24.5-32.1 | 57-98 |
| September | 0-965 | 24.5-36.0 | 40-99 |
| October | 0-912 | 18.5-37.5 | 7-99 |
| November | 0-824 | 16.4-37 | 7-99 |
| December | 0-737 | 11.0-30.5 | 10-97 |

Again, to fill the gap between the water demand of the greenhouse system 100 and water produced from the primary heat exchanger 104, ambient air at the water surface is passed through the secondary heat exchanger 106. As the secondary heat exchanger 106 is immersed at a depth where the water's temperature is much lower than the ambient air's dew point temperature, significant air dehumidification occurs. This results in the production of water, which may be used to fulfill the remaining irrigation needs of the greenhouse system. The mass balance of the ambient air-water cycle is given by Equation 12.

$$\dot{m}_3 = \dot{m}_4 + \dot{m}_{water,condensed} \quad \text{Equation 12}$$

In Equation 12, $\dot{m}_3$ is the mass of air entering the secondary heat exchanger 106, $\dot{m}_4$ is the mass of air leaving the secondary heat exchanger 106, and $\dot{m}_{water,condensed}$ is the water condensed in the secondary heat exchanger 106 as a result of losing heat to the cooler water. The condensed water is collected and used as needed. Moreover, the energy balance equation applied to the secondary heat exchanger 106 is given in Equation 13.

$$\dot{m}_3 h_3 = \dot{m}_4 \cdot h_4 + \dot{m}_{water,condensed} \cdot h_{water,condensed} + \dot{Q}_{loss} \quad \text{Equation 13}$$

In Equation 13, $\dot{Q}_{loss}$ is the heat lost to the water. The electricity required to operate the different greenhouse operations is provided by the solar panel 110 installed on the greenhouse system 100. The power produced by the solar panel 110 is given by Equation 14, where $I_{poa}$ is the plane of array solar irradiance, $P_{max}$ is the maximum power of the solar panel, $\gamma$ is the temperature coefficient of the solar panel, $T_{ref}$ is the reference temperature, and $T_{cell}$ is the temperature of the solar panel. $T_{cell}$ is given by Equation 15.

$$P = \frac{I_{poa}}{1000} \cdot P_{max} \cdot [1 + \gamma \cdot (T_{cell} - T_{ref})] \quad \text{Equation 14}$$

$$T_{cell} = T_{module} + \frac{I_s}{I_{poa}} \cdot \Delta T \quad \text{Equation 15}$$

In Equation 15, $\Delta T$ is the temperature difference between the front and the back surface of the solar panel and $T_{module}$ is the temperature of the module given by Equation 16. In Equation 16, a and b are the characteristics of the solar panel and W is the wind speed.

$$T_{module} = I_{poa} + e^{(a+b \cdot W)} + T_{Amb}(t) \quad \text{Equation 16}$$

The mass and energy balance of the main components of the greenhouse system are given in Table IV. The following assumptions are made in the analysis of the greenhouse system: (1) in the greenhouse, total water demand is assumed to be 110% of the overall evapotranspiration rate, which is used to overcome any possible losses from the greenhouse system; (2) the design values for ambient conditions are $T_o=25°$ C., $P_0=101.325$ kPa, and $\varphi=75\%$; and (3) the temperature of water at the depth of the primary heat exchanger 104 is 18° C. and at the depth of the secondary heat exchanger 106 is 8° C.

TABLE IV

Mass and energy balance equations of the greenhouse system.

| Mass balance equations | |
| --- | --- |
| Plantation area | $\dot{m}_2 + \dot{m}_{Evapotranspiration} = \dot{m}_1$ |
| Primary heat exchanger | $\dot{m}_1 + \dot{m}_{water,condensed} = \dot{m}_2$ |
| Secondary heat exchanger | $\dot{m}_3 = \dot{m}_4 + \dot{m}_{water,condensed}$ |
| Energy balance equations | |
| Plantation area | $\dot{m}_2 \cdot h_2 + \dot{m}_{Evapotranspiration} \cdot h_{Evapotranspiration} + \dot{Q}_{GH} = \dot{m}_1 \cdot h_1$ |
| Primary heat exchanger | $\dot{m}_1 \cdot h_1 = \dot{m}_2 \cdot h_2 + \dot{m}_{water,condensed} \cdot h_{water,condensed} + \dot{Q}_{loss}$ |
| Secondary heat exchanger | $\dot{m}_3 \cdot h_3 = \dot{m}_4 \cdot h_4 + \dot{m}_{water,condensed} \cdot h_{water,condensed} + \dot{Q}_{loss}$ |

Not only can a range of analysis be completed on many variables, but the effects of solar irradiation, ambient temperature, and the variations in ambient relative humidity on the greenhouse system 100 can also be analyzed. First, solar irradiation varies significantly throughout the day and night cycles and months of the year. Thus, it is important to analyze the effects of solar irradiation on the microclimate of the greenhouse system 100, the water demand, and the water production in the system. In addition, the mass flow rate of air circulating through the system also affects the microclimate.

Figure 2A:
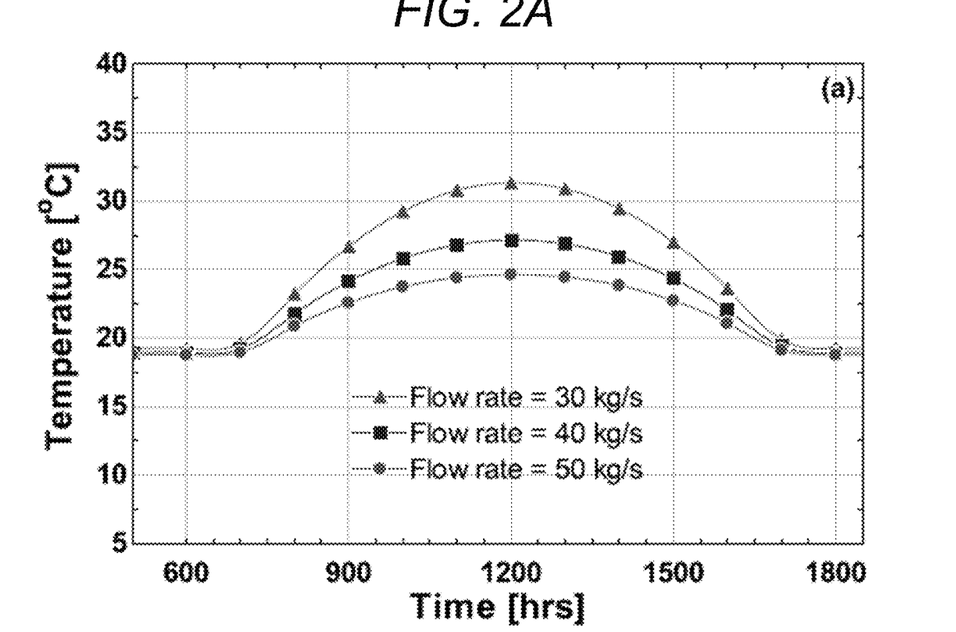
FIGS. 2A and 2B illustrate the effects of solar irradiation and mass flow rates on the temperature inside the greenhouse system, according to various examples of the present disclosure.
Figure 2B:
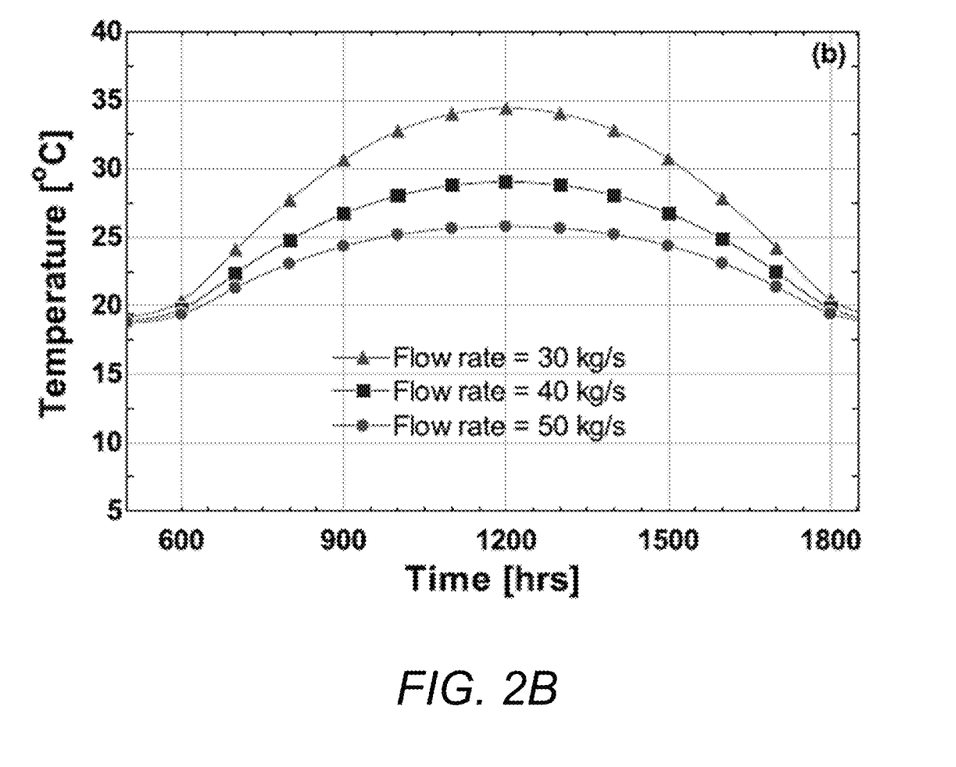
Figure 3A:
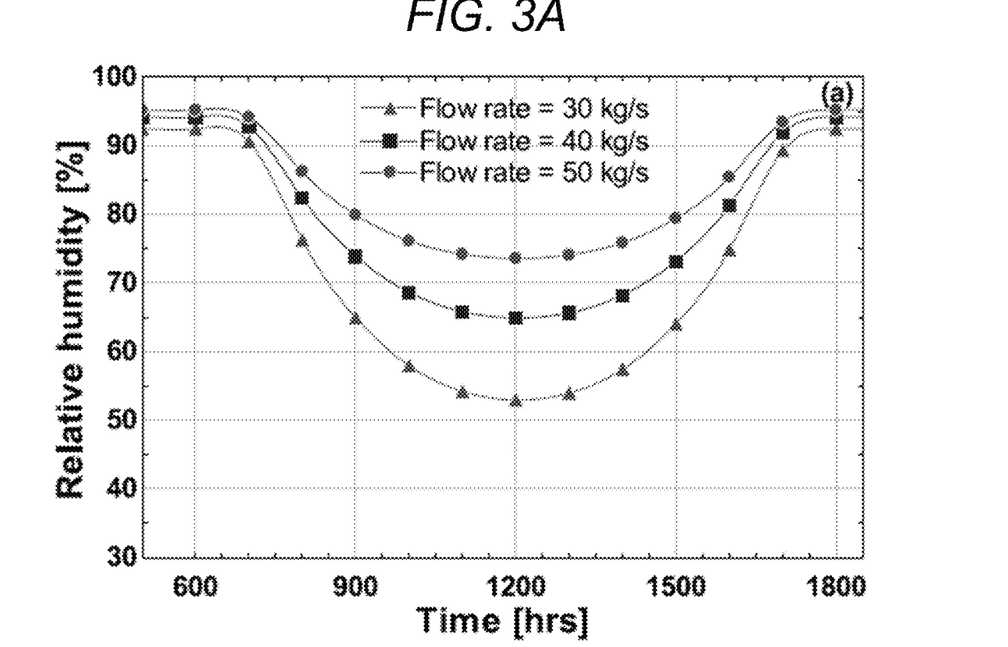
FIGS. 3A and 3B illustrate the effects of solar irradiation and mass flow rates on the relative humidity inside the greenhouse system, according to various examples of the present disclosure.
Figure 3B:
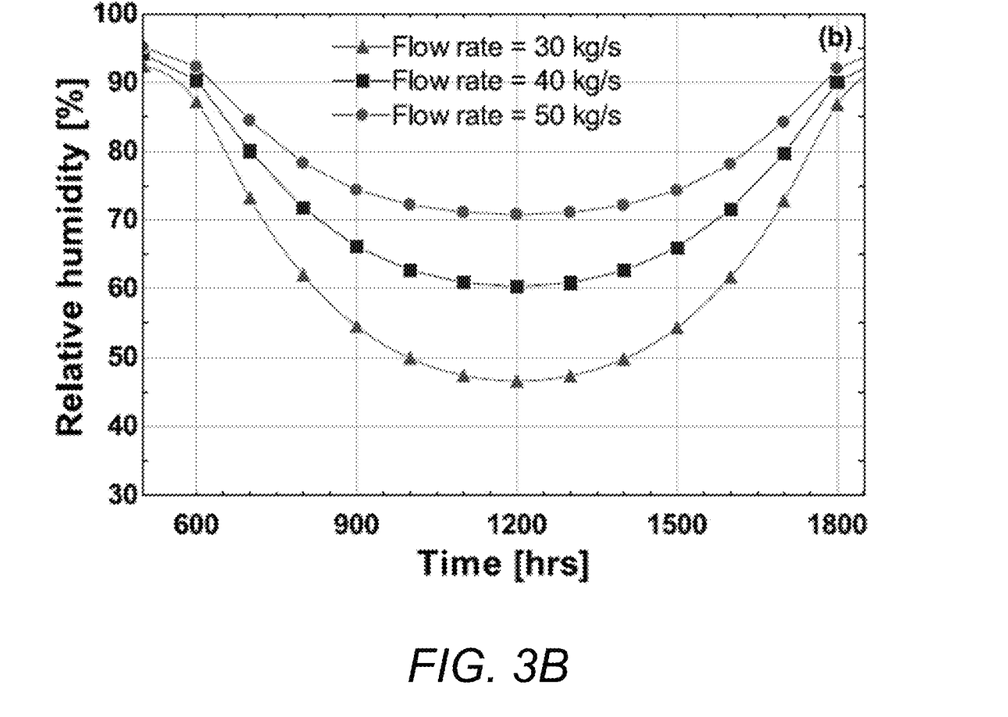

FIGS. 2A and 2B illustrate the effects of solar irradiation and mass flow rates on the temperature inside the greenhouse system, according to various examples of the present disclosure. FIG. 2A corresponds to January 10, and FIG. 2B corresponds to July 10. Further, FIGS. 3A and 3B illustrate the effects of solar irradiation and mass flow rates on the relative humidity inside the greenhouse system, according to various examples of the present disclosure. FIG. 3A corresponds to January 10, and FIG. 3B corresponds to July 10.

FIGS. 2A to 2B and 3A to 3B illustrate several trends. Namely, an increase in solar irradiation causes the temperature of the greenhouse system to increase, whereas the relative humidity of the greenhouse system decreases. Also, while maintaining the airflow rate at 40 kg/s on a typical day during summer, the maximum temperature and minimum relative humidity reached in the greenhouse are 29° C. and 60.3%, respectively. Similarly, with the same airflow rate on a typical day during winter, the maximum temperature and minimum relative humidity reached in the greenhouse are 27.15° C. and 64.9%, respectively.

Moreover, the increased air mass flow rate through the greenhouse system results in more stable microclimatic conditions (i.e. fewer variations). In an example, an increased mass flow rate may cause the total volumetric replacement of the air within the greenhouse system to become quicker while maintaining the total heat influx rate into the greenhouse system, which results in conditions closer to the inlet air (i.e. the exit of the primary heat exchanger). However, when the mass flow rate of air is higher than the value, the energy consumed to maintain the conditioned air flow rate, which is directly proportional to the mass flow rate, is minimal. For instance, the airflow rate can be reduced even more in winter while maintaining the optimum microclimate inside the greenhouse system. This will reduce the energy consumption of the greenhouse system in winter.

Figure 4A:
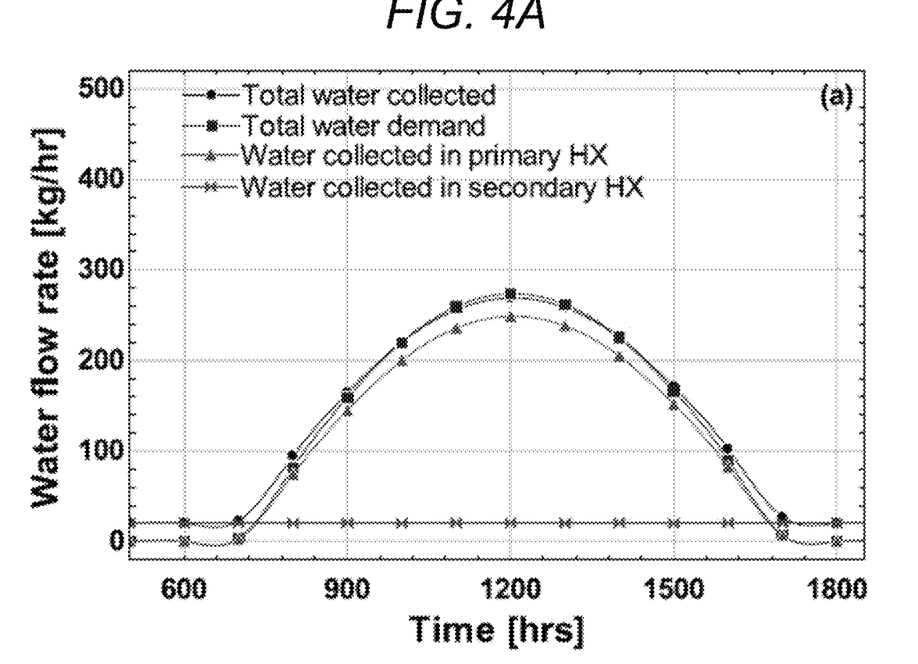
FIGS. 4A and 4B illustrate variations in water demands and production in the greenhouse system, according to various examples of the present disclosure.
Figure 4B:
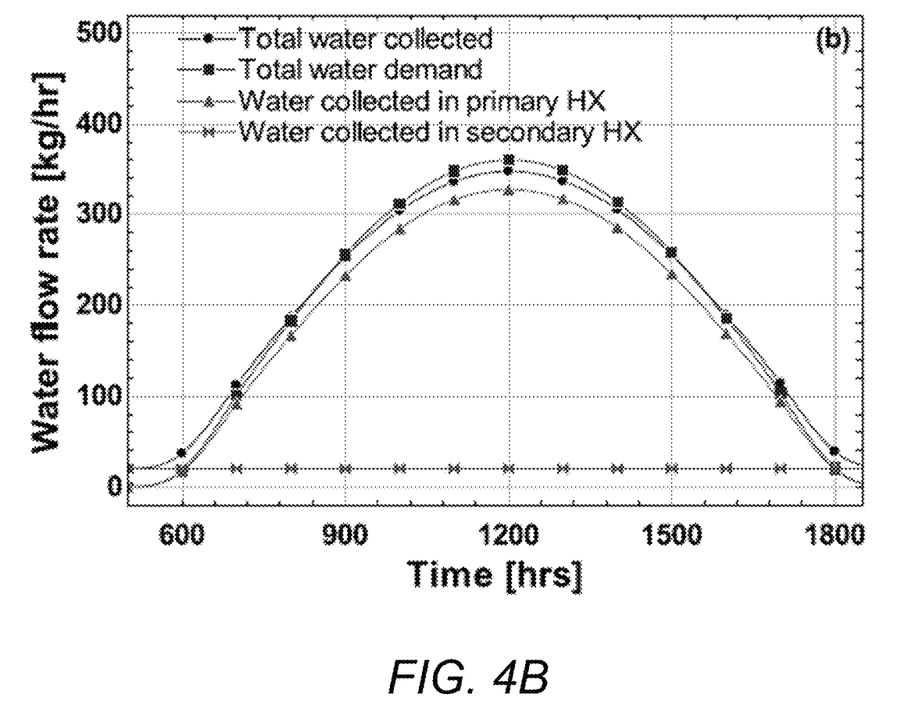

Besides the microclimatic conditions inside the greenhouse, solar irradiation also impacts the quantities of the total water demand, total water produced, and water produced in the first heat exchanger and the second heat exchanger. FIGS. 4A and 4B illustrate variations in water demands and production in the greenhouse system, according to various examples of the present disclosure. FIG. 4A corresponds to January 10, and FIG. 4B corresponds to July 10.

As discussed before, with the increase in solar irradiation, the rate of photosynthesis and the temperature inside the greenhouse system increases. An increase in the rate of photosynthesis results in an increase in the evapotranspiration rate. Similarly, the increased temperature inside the greenhouse system results in decreased relative humidity, which results in an enhanced affinity for moisture addition in the air within the greenhouse system, and thus the evaporation from plants increases. These effects cumulatively result in a proportional increase in the plants' total water demand, and for this reason, the trend of plants' total water demand is identical to the solar irradiation curve. For the same reason, during the night-time, when there is no solar irradiation, the water addition to the air in the greenhouse reduces significantly, and so, the irrigation water demand also drops. Similarly, as solar irradiation varies in different seasons, the irrigation water demand accordingly varies in different seasons too. For instance, the daily water demand in winter is approximately 38% lower than the daily water demand in summer.

Moreover, FIGS. 4A to 4B also demonstrate that the total water produced in the system, which is the sum of water produced in the primary heat exchanger and the secondary heat exchanger, also follows the solar irradiation trends. The reason for this trend is that the water produced in the primary heat exchanger is approximately the same water that is added to the air in the greenhouse as a result of evapotranspiration, which is a function of solar irradiation. Finally, the water produced in the secondary heat exchanger is independent of the solar irradiation values and depends upon the temperature at the immersion depth of the secondary heat exchanger and the air's mass flow rate through the heat exchanger.

Figure 5:
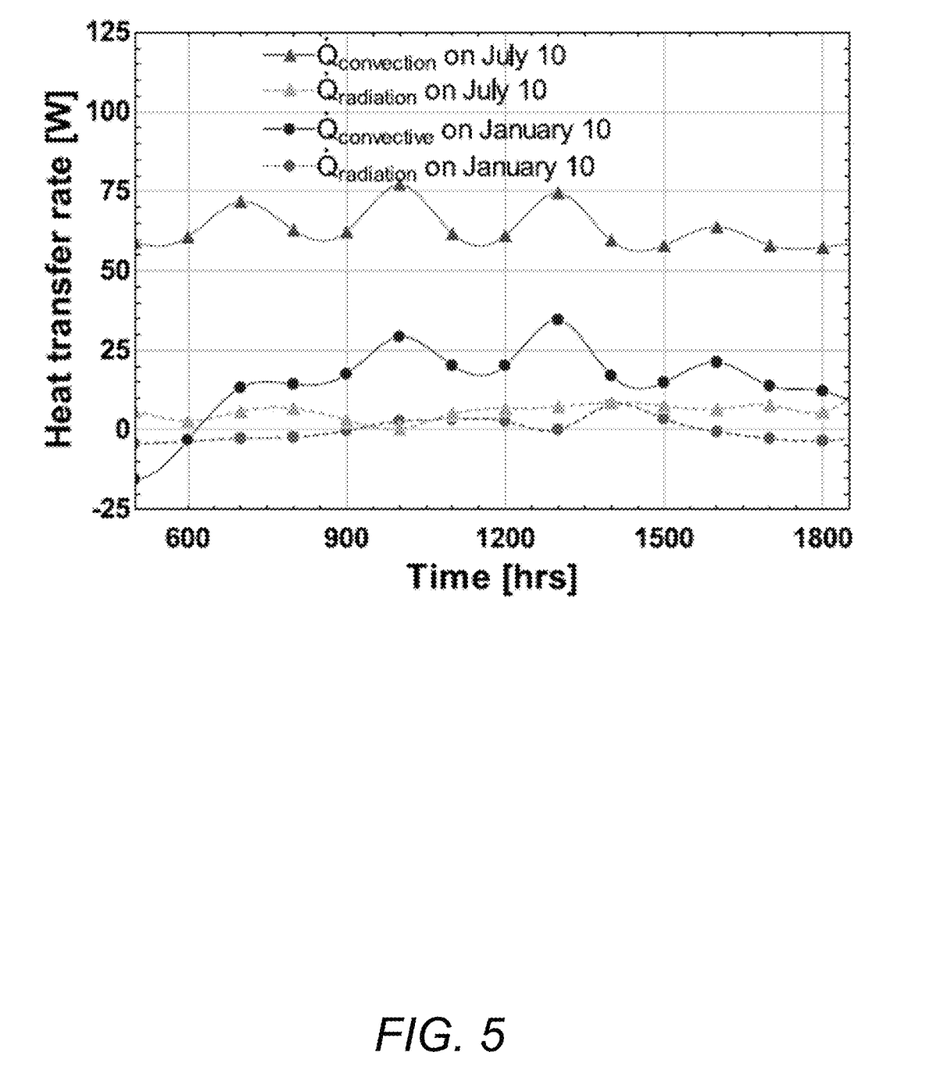
FIG. 5 illustrates the effect of ambient temperature on greenhouse convection and radiation heat flux, according to various examples of the present disclosure.

Besides solar irradiation, the ambient temperature also impacts the microclimatic conditions as the heat entering the greenhouse through convection and radiation varies, as illustrated in FIG. 5. FIG. 5 illustrates the effect of ambient temperature on greenhouse convection and radiation heat flux, according to various examples of the present disclosure. During the winter period, at night, the greenhouse system may lose heat to the external surroundings through convection and radiation as the ambient temperature is lower than the temperature of the greenhouse system. However, during the summer, the ambient temperature is generally higher than the temperature of the greenhouse system throughout the day, which adds to the total cooling load of the system. The effect of the heat flux entering the greenhouse system through convection is more significant than the radiation heat transfer.

Figure 6A:
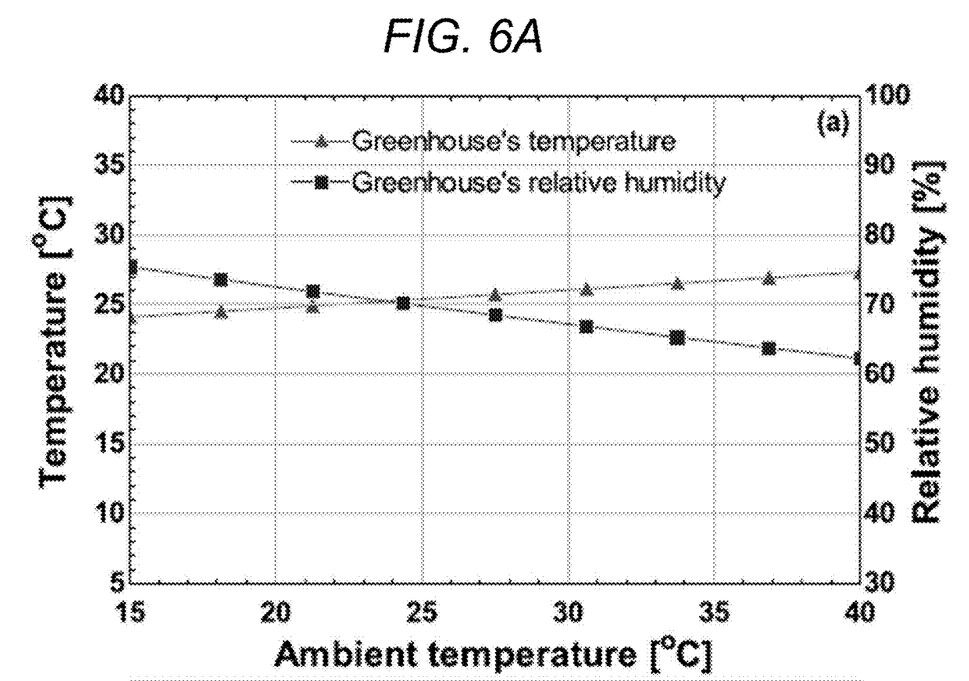
FIGS. 6A and 6B illustrate the effects of variations in ambient temperature on the microclimate and the water flow within the greenhouse system, according to various examples of the present disclosure.
Figure 6B:
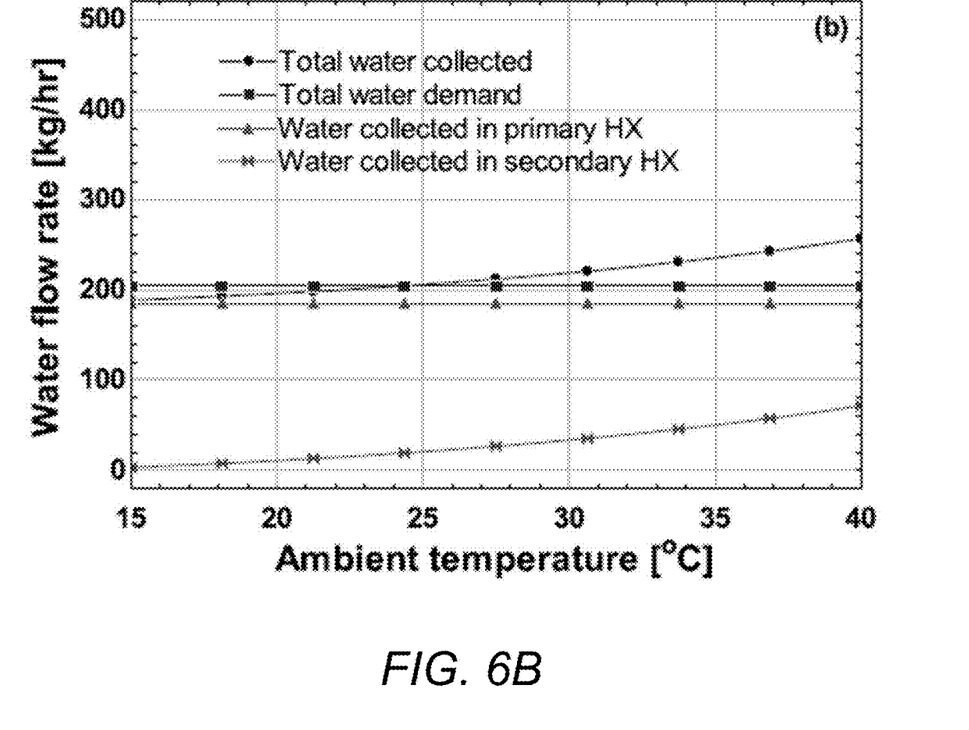

The ambient temperature subsequently affects the temperature within the greenhouse system and the water flow rates in the system. FIGS. 6A and 6B illustrate the effects of variations in ambient temperature on the microclimate and the water flow within the greenhouse system, according to various examples of the present disclosure. FIGS. 6A to 6B show that with an increase in the ambient temperature, the temperature inside the greenhouse system increases, and the relative humidity values inside the greenhouse system decreases.

Figure 7A:
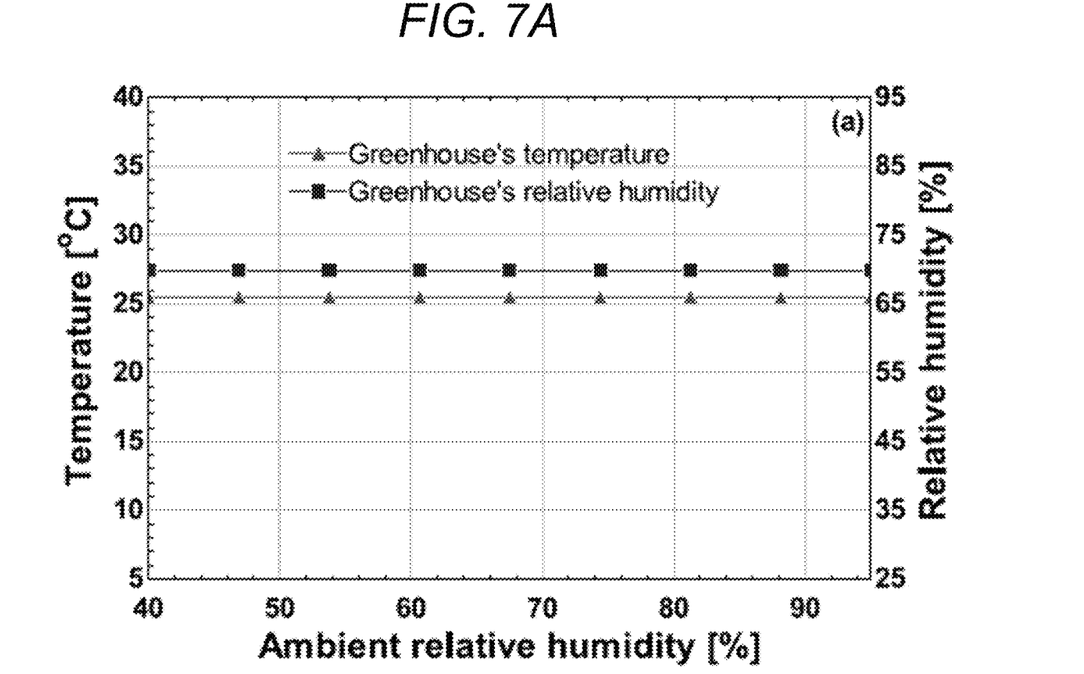
FIGS. 7A to 7B illustrate the effects of variations in ambient relative humidity on greenhouse microclimate and water flow rates in the system, according to various examples of the present disclosure.
Figure 7B:
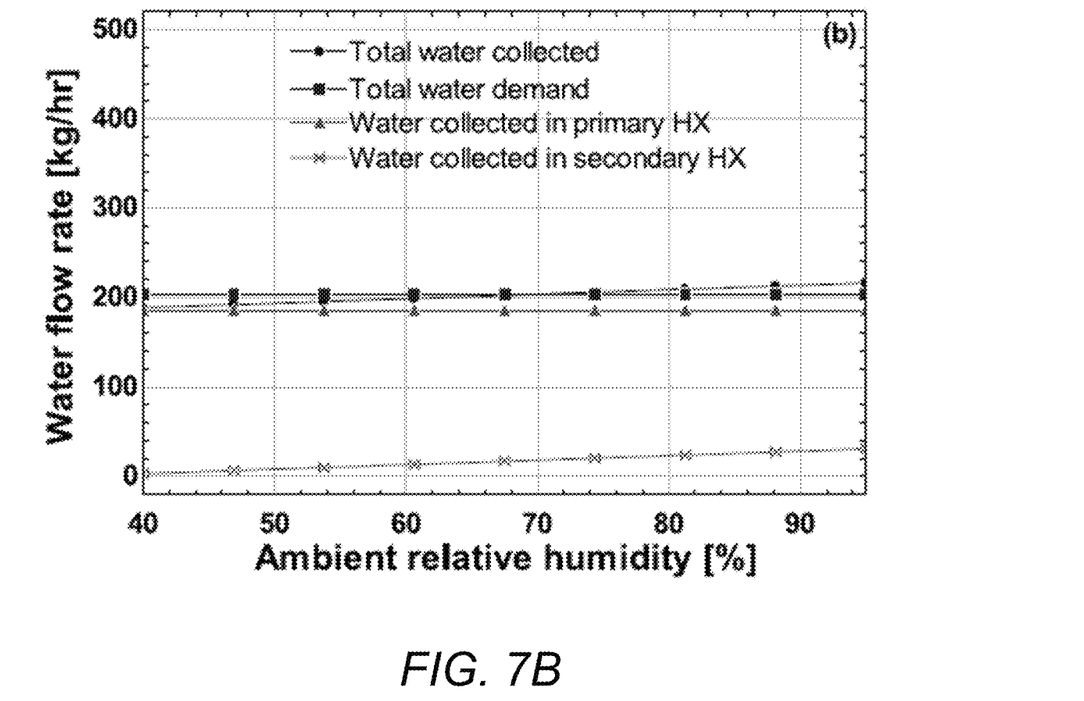

FIGS. 7A to 7B illustrate the effects of variations in ambient relative humidity on greenhouse microclimate and water flow rates in the system, according to various examples of the present disclosure. FIG. 7 shows that the ambient relative humidity does not influence the temperature or relative humidity inside the greenhouse system (FIG. 7A). However, variations in ambient relative humidity affect the water produced in the secondary heat exchanger and hence, the total water produced (FIG. 7B). With an increase in the ambient relative humidity, the water production in the secondary heat exchanger increases due to the correspondingly increased total water content in the ambient air.

Although the greenhouse system 100 has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present disclosure can be practiced otherwise than specifically described without departing from the scope and spirit of the present embodiments. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

The invention is claimed as follows:

1. A greenhouse system, comprising:
an enclosed platform for growing a plant, wherein the enclosed platform is configured to float at water level;
a first heat exchanger at a first depth below water level; and
a second heat exchanger at a second depth below water level;
wherein a first portion of air from the enclosed platform passes through the first heat exchanger;
wherein the first portion of air from the enclosed platform that passes through the first heat exchanger undergoes dehumidification and results in a first amount of produced water;
wherein a second portion of air from outside the enclosed platform passes through the second heat exchanger;
wherein the second portion of air from outside the enclosed platform that passes through the second heat exchanger undergoes dehumidification and results in a second amount of produced water;
wherein the first amount of produced water is used to irrigate the plant;
wherein the plant needs a total amount of water;
wherein if the total amount of water is more than the first amount of produced water, a third amount of water from the second amount of produced water is used to irrigate the plant; and
wherein the third amount of water is equal to a difference between the total amount of water and the first amount of produced water.

2. The greenhouse system according to claim 1, wherein the second depth is greater than the first depth.

3. The greenhouse system according to claim 1, wherein the first heat exchanger is configured to maintain a psychrometric condition within the greenhouse system.

4. The greenhouse system according to claim 3, wherein the psychrometric condition within the greenhouse system is based on the first depth of the first heat exchanger.

5. The greenhouse system according to claim 1, wherein the second heat exchanger provides water to the greenhouse system based on the second depth of the second heat exchanger.

6. The greenhouse system according to claim 1, further comprising a plurality of fans.

7. The greenhouse system according to claim 6, wherein a first fan of the plurality of fans is configured to pass air through the first heat exchanger.

8. The greenhouse system according to claim 7, wherein the first fan is configured to pass air from within the greenhouse system through the first heat exchanger.

9. The greenhouse system according to claim 6, wherein a second fan of the plurality of fans is configured to pass air through the second heat exchanger.

10. The greenhouse system according to claim 9, wherein the second fan is configured to pass air from outside of the greenhouse system through the second heat exchanger.

11. The greenhouse system according to claim 1, further comprising a solar panel configured to provide electricity to the greenhouse system.

\* \* \* \* \*